United States Patent

Solotorevsky

(10) Patent No.: US 9,736,033 B2
(45) Date of Patent: Aug. 15, 2017

(54) OPERATIONAL BUSINESS SERVICE VERIFICATION SYSTEM

(75) Inventor: Gad Solotorevsky, Even Yehuda (IL)

(73) Assignee: Amdocs Development Limited, Limassol (CY)

( * ) Notice: Subject to any disclaimer, the term of this patent is extended or adjusted under 35 U.S.C. 154(b) by 535 days.

(21) Appl. No.: 13/525,926

(22) Filed: Jun. 18, 2012

(65) Prior Publication Data

US 2012/0323808 A1     Dec. 20, 2012

(30) Foreign Application Priority Data

Jun. 19, 2011  (IL) .......................................... 213640

(51) Int. Cl.
| | |
|---|---|
| H04L 12/24 | (2006.01) |
| H04M 15/00 | (2006.01) |
| G06Q 10/10 | (2012.01) |
| H04L 9/32 | (2006.01) |
| G06Q 20/40 | (2012.01) |
| G06Q 20/32 | (2012.01) |
| G06Q 30/00 | (2012.01) |

(52) U.S. Cl.
CPC ......... *H04L 41/5029* (2013.01); *G06Q 10/10* (2013.01); *H04M 15/73* (2013.01); *H04M 15/8016* (2013.01); *H04L 41/5074* (2013.01)

(58) Field of Classification Search
USPC ....................................................... 705/317
See application file for complete search history.

(56) References Cited

U.S. PATENT DOCUMENTS

| | | | | |
|---|---|---|---|---|
| 6,178,510 | B1* | 1/2001 | O'Connor | G06Q 20/02 726/5 |
| 2004/0078340 | A1* | 4/2004 | Evans | G06Q 20/10 705/64 |
| 2006/0218651 | A1* | 9/2006 | Ginter | G06Q 40/12 726/27 |
| 2006/0272028 | A1 | 11/2006 | Maes | |
| 2008/0273679 | A1 | 11/2008 | Travis et al. | |
| 2009/0204524 | A1* | 8/2009 | McGeorge | G06Q 20/32 705/35 |

FOREIGN PATENT DOCUMENTS

WO     2010017825 A1     2/2010

* cited by examiner

*Primary Examiner* — Mark A Fleischer
(74) *Attorney, Agent, or Firm* — Zilka-Kotab, PC

(57) ABSTRACT

A method and a system are described for providing operational business service verification in a telecommunication network. The method comprises the steps of: (i) receiving information which relates to transactions from a plurality of information sources, wherein the transactions are associated with one or more pre-defined applications; (ii) based upon the information received, determining whether that at least one pre-defined transaction criterion has been met; and (iii) if the at least one pre-defined transaction criterion has been met, providing verification of the legitimacy of the respective transaction that relate to that pre-defined application.

4 Claims, 1 Drawing Sheet

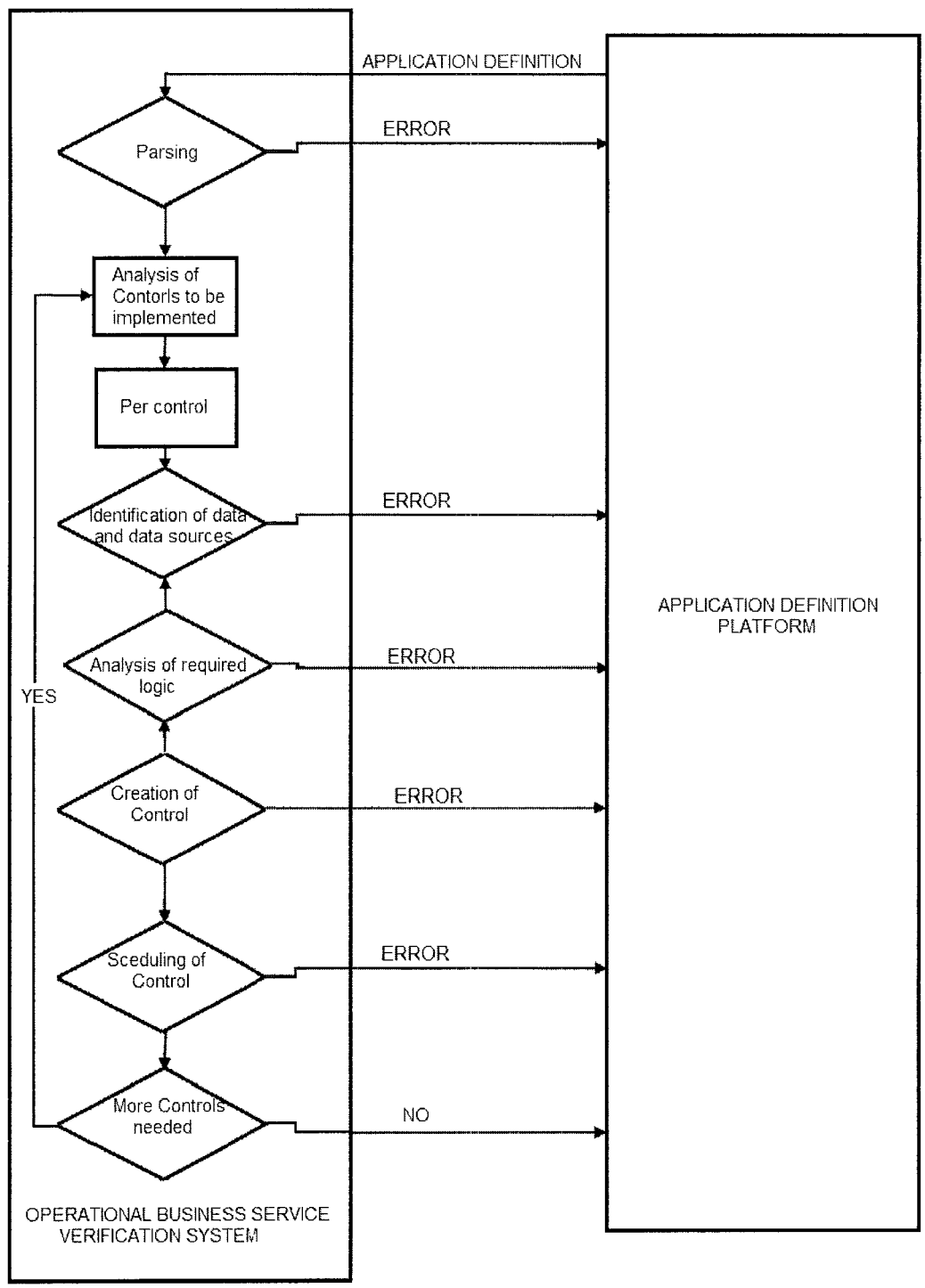

OPERATIONAL BUSINESS SERVICE VERIFICATION SYSTEM

CROSS-REFERENCE TO RELATED APPLICATIONS

This application claims priority of Israel Patent Application No. 213640, filed Jun. 19, 2011, the disclosure of which is incorporated by reference herein in its entirety.

TECHNICAL FIELD

The present invention relates to methods and systems for verifying operational business services. In particularly, the invention may be used in environments that are adapted to allow creating of applications, apps, services, utilities, applets and the like on top of an already existing platform, such as platforms of telecommunication service providers.

BACKGROUND

A telecommunications network can be of several types, including mobile telecommunications networks and fixed telecommunications networks. Mobile telecommunication networks may include telecommunications networks hosted on networks of cellular stations and mobile telephones, pagers, radio-devices, and other infrastructure and portable devices which allow a user to communicate wirelessly. Mobile telecommunications networks also include those networks hosted on satellites and portable ground stations, vehicle-mounted communications gear, and handheld devices.

Fixed telecommunications networks may include telecommunications networks hosted on public switched telephone networks (PSTN), land lines, and wired infrastructure within businesses and homes. Fixed telecommunications networks may also include those hosted over the Internet or local internets connecting computers, network appliances, Voice over Internet Protocol (VoIP) telephones, and other devices.

Telecommunications services, which are also referred to hereinafter as "services," may include services such as voice mail, call conferencing, presence detection, and call hunting. Services are typically provided by service providers.

An Operations Support System (also referred to as an operational support system or OSS) is a computer-based system used by telecommunications service providers. The term OSS most frequently describes "network system" dealing with the telecom network itself, supporting processes such as maintaining network inventory, provisioning of services, configuring network components, and managing faults. The complementary term a business support system, or BSS, is a newer term and typically refers to "business systems" dealing with customers, supporting processes such as taking orders, processing bills, and collecting payments. The two systems together are often abbreviated OSS/BSS, BSS/OSS or simply B/OSS.

Business support systems (BSS) are the components that a telephone operator or a cable operator or a satellite operator uses to run its business operations towards customer. BSS and OSS platforms are linked in the need to support various end to end services. Each area has its own data and service responsibilities.

Different subdivisions of the BSS/OSS systems are made, depending on whether they follow the TM Forum's diagrams and terminology, industry research institutions or BSS/OSS vendors own view. Nevertheless in general, an OSS covers at least the application areas: network management systems, service delivery, service fulfillment, including the network inventory, activation and provisioning, service assurance and customer care.

An OSS and a BSS can run on the same computer or computers and may be integrated with each other. Also, OSS and BSS may have separate or shared database repositories.

A BSS repository may store customer information from a service provider point of view, such as customer address information, customer billing information, products purchased by the customer, and campaigns to which a customer has responded. A BSS repository also can include subscription information for a customer, such as information for any voice, wireless, or roaming plan, as well as number of minutes purchased per month, etc. Such information is treated as product information from a BSS point of view, and the BSS repository also will include information as to whether a particular customer is subscribing to that product. If, for example, a customer subscribing to a new subscription is entitled to a new phone, that information typically will be maintained in the BSS repository. A BSS repository also typically is used to maintain trouble tickets, such as information regarding problems with service or failure to receive a form, as well as maintaining security credentials.

An OSS repository, on the other hand, is used for monitoring and administration of the system or other OSS operations such as charging/rating and activation provisioning. An OSS repository can also contain subscriber information such as information for the current and active bill for a customer, an inventory of assets associated with a customer, types of products or services provided to a customer, etc. A repository at the network level might include current network information for a customer, such as whether the customer is logged onto the network, a location of the customer on the network, whether a customer device is active, etc.

A service resource such as a Service Delivery Platform (SDP) repository. The term Service Delivery Platform (SDP) as used herein, usually refers to a set of components that provide a services' delivery architecture (such as service creation, session control and protocols) for a given type of service. The business objective of implementing the SDP is to enable rapid development and deployment of new converged multimedia services, from basic POTS phone services to complex audio/video conferencing for multiplayer games (MPGs).

In telecommunications, service providers not only deal with the networks assets, platforms, and services, but must also support business processes to provide services to their customers and interact with their partners and suppliers, as well as operational processes to monitor and administer these assets. Tools, infrastructure, data repositories, and applications for performing these tasks are referred to as service provider business support systems (BSS) and operational support systems (OSS). BSS typically includes resources that support the business aspects (e.g. CRM, PRM, ERP, Analytics, financial, revenue management) while OSS supports the execution of the business with aspects like monitoring, management, and administration; resolution of trouble; billing and/or charging; provisioning; activation; fulfillment; etc.) In any service provider, services and runtime interact with OSS and BBS. Today, OSS and BSS are often complex archaic systems designed for legacy networks where services, hardware, and network resources consist mainly of static components.

However, one of the problems which arise in such environments is the verification of the correctness/completeness/validity/legality of transactions which relate to certain applications.

SUMMARY OF THE DISCLOSURE

The disclosure may be summarized by referring to the appended claims.

It is an object of the present invention to provide a method and a system for providing operational business service verification in a telecommunication network.

It is another object of the present invention to provide a method and a system to verify the legitimacy of transactions that relate to a pre-defined application.

It is another object of the present invention to provide a method and a system to verify the legitimacy of transactions that relate to an add-on to an application platform.

It is yet another object of the present invention to provide a method and a system to allow creating control measures as a new application has been defined, wherein these control measures allow verifying the legitimacy of future actions when taken that relate to this new application.

Other objects of the present invention will become apparent as the description of the invention proceeds.

According to one embodiment, there is provided a method for providing operational business service verification in a telecommunication network, wherein the method comprises the steps of:

receiving information which relates to transactions from a plurality of information sources, wherein the transactions are associated with one or more pre-defined applications;

based upon the information received, determining whether that at least one pre-defined transaction criterion has been met; and if the at least one pre-defined transaction criterion has been met, providing verification of the legitimacy of the respective transaction that relate to that pre-defined application.

The term "transaction" as used herein through the specification and claims, is used to denote a financial transaction that should be verified. In the alternative or in addition, this term is used herein to denote determination on whether an appropriate service has been provided according to appropriate parameters, (e.g. if the service was provided at the appropriate Quality of Service, and/or the appropriate bandwidth was allocated while providing the service), so that determination should be verified.

The term "legitimacy of a transaction" as used herein through the specification and claims, is used to denote correctness and/or accuracy and/or completeness and/or validity and/or legality (e.g. has the service been provided in accordance with the terms at which the customer had ordered the service) of transactions that relate to the one or more pre-defined applications.

The term "application" as used herein throughout the specification and claims, is used to denote application software, also known as an application and/or an apps and/or services and/or utilities and/or applets, designed to help the user to perform specific tasks. Apps may be bundled with the computer and its system software, or may be published separately. Application software applies the power of a particular computing platform or system software to a particular purpose. Some applications are available in versions for several different platforms.

In accordance with another embodiment, the application is an add-on to an application platform (e.g. Apple's platform), provided that the latter is configured to allow the add-on application to operate on top of the application platform.

According to another embodiment, the method provided further comprises a step of invoking one or more control means upon utilizing the application, wherein the one or more control means trigger the method for the provisioning of the operational business service verification, by verifying the legitimacy of respective transactions.

In accordance with yet another embodiment, the method provided further comprising a step of invoking one or more control measures upon defining (e.g. upon creating, upon uploading etc.) one of the one or more pre-defined applications, wherein the control measures allow verifying the legitimacy of future actions that relate to the application that has been defined.

According to another embodiment, the method further comprises a step of applying at least one additional control means configured to verify other aspects of the transactions. Preferably, the at least one additional control is executed based upon a pre-determined schedule.

By still another embodiment, the information that relates to transactions may be retrieved in any one or more forms, including for example, pull and push. Some of the information sources may push relevant information to a verification system operative in accordance with the present invention, while in other cases the required information may be pulled from other systems. In addition, the information can be pulled and/or pushed during or after the service is provided.

In another embodiment there is provided a system operative to provide operational business service verification in a telecommunication network which comprises: means to define an operational business service-related application, a receiver operative to receive information from a plurality of information sources which relates to transactions that are associated with an application (e.g. application-related information), a processor operative to verify based on the information received that at least one pre-defined transaction criterion is met, and if the at least one pre-defined transaction criterion is met, to verify the legitimacy of the transactions which relate to the application which has been defined.

According to another embodiment there is provided a computer program product encoding a computer program stored on a non-transitory computer readable storage medium for executing a set of instructions by a computer system comprising one or more computer processors, for carrying out a method that comprises:

processing information that was provided from a plurality of information sources which relates to transactions that are associated with one or more pre-defined applications;

based upon the information received, determining whether that at least one pre-defined transaction criterion has been met; and determining that the legitimacy of the respective transaction (that relates to that pre-defined application) is verified, if the at least one pre-defined transaction criterion has been met.

BRIEF DESCRIPTION OF THE DRAWINGS

For a more complete understanding of the present invention, reference is now made to the following detailed description taken in conjunction with the accompanying drawings wherein:

FIG. 1 demonstrates an example of a process of defining the controls in accordance with an embodiment of the method provided by the present invention.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

Following are some illustrative examples that are not intended in any way to restrict the scope of the invention, but rather to ease the reader's understanding of the disclosure.

As a first example, let us assume that a new service is created for streaming movies where advertisements are incorporated. This new service includes the following financial elements:

1. The subscriber (user) pays a fixed price of 2 USD per movie;
2. The advertisements' provider (AP) may provide up to 3 advertisements per movie—and pays 20 cents for each advertisement that was displayed;
3. The service provider (SP) and the communication service provider (CSP) share their revenues from this service, on the basis of 30% to the CSP and 70% to the SP;
4. The CSP charges and collects the revenues from the subscribers;
5. The CSP charges and collects the revenues from the AP;
6. The Revenue Sharing takes place only after the charges have been billed;
7. If a movie was delivered to a subscriber at a low quality (e.g., at high jitter during part of the display time), the subscriber would get a 50% discount on the price paid; and
8. If the movie was interrupted due to a technical problem at any stage, the subscriber would not be charged for that movie. Moreover, he will get an option to see two free movies in the future.

The list of the above financial elements is provided to the processor of the verification system of the present invention which parses and analyzes the constraints included therein.

According to one embodiment, when a new application is being defined (or created or uploaded, etc.), the list of the above financial elements is provided to the processor, thereby enabling the creation of the at least one pre-defined transaction criterion, for verifying the legitimacy of future actions that relate to this application. Based on the constraints provided to the processor, the latter automatically constructs the required operational business service verification controls. During the process of constructing the controls, the system identifies the required data (information) and data sources from which that required data will be retrieved.

In the present example, data may be received from any two or more of the following information sources: a billing system, an intelligent network, a system that monitors the quality of streaming, the SP system that delivers the application and the AP system that delivers the advertisements. Naturally, there could be other data sources that are capable of providing relevant information as may be required in a system operating in accordance with this example.

Now, when a subscriber uses the service, the SP sends a notification to the system which specifies the service that is being used and the identity of the subscriber using that service. Also, the SP sends a different notification every time an advertisement is displayed to the subscriber and a further type of notification when the movie ends.

The system also retrieves information from other systems such as information required to verify the quality of service provided, to determine whether there were any technical problems, was the subscriber provided with a free movie, has the subscriber been exercising his right to get a free movie, what was the amount which the subscriber was charged, the amount of the revenue to be shared, etc. Based on all the information that has been retrieved, the system verifies the following:

1. Has the subscriber been charged properly according to the financial elements provided?
2. Has the SP received the correct revenue share?
3. Has the CSP received the correct revenue share?
4. Has the AP paid the correct amount?
5. In case that the subscriber received a "free movie", has it been granted to him rightfully?

Depending on the exact scenario and the exact control applied, the verification may take place under real time conditions (i.e. immediately upon providing the required information to the system), immediately after the service ends, or long after the service has ended (e.g., when the billing between the SP and the CSP is carried out on a monthly base). The at least one pre-defined transaction criterion in this case may be for example a determination of whether the service provider has received the right amount of revenues in accordance with the service definitions, and if in the affirmative—the transaction (which is in this case a financial transaction) is verified.

In the example demonstrated above, all the Operational Business Service Verification controls were Revenue assurance controls. However, as will be appreciated by those skilled in the art, the invention is not limited to Revenue Assurance controls and any other families of controls such as Fraud detection controls for example may be applied. Also, the invention may be implemented with or without using Revenue assurance controls, all without departing from the scope of the present invention.

Following is another example of carrying out an embodiment of the present invention.

1. The system processor is provided with information that relates to a definition of transactions (financial transactions) that should be associated with a certain application as well as all the factors that may impact the value of these transactions;
   1.1. The definition is provided via APIs or definition files or GUI or any other method known in the art per se;
   1.2. The definition may be a detailed definition, or may use templates provided by the system, that can be used by each one of a plurality of similar applications (e.g., a template for ringtone download application);
2. The system parses and inspects the defined behavior
   2.1. The definition is approved or rejected based on various pre-defined criteria which the system checks against the information provided under section 1;
   2.2. The criteria include but are not limited to:
      2.2.1. The use of an approved billing and settlement mechanism;
      2.2.2. The use of an approved tariff scheme;
      2.2.3. The availability of the required reference data;

2.2.4. The capability of the application to automatically implement the required Operational Business Service Verification controls; and
2.2.5. The completeness of the definition
2.3. The at least one pre-defined transaction criterion that should be met may change from one application to another, depending on factors such as the manufacturer of the application, the nature of the application (streaming, download, location-based), and the like.
2.4. If the definition is not approved then:
2.4.1. A denial notification is sent to the application provider;
2.4.2. Notifications of the denial may be sent to other systems, and/or recorded in databases;
2.4.3. Certain actions may be taken such as, but not limited to, preventing the application from running, generating an Alarm, generating a trouble ticket, recording in a database that the service is not certified;
3. If the defined behavior is approved then:
3.1. Based on the definitions provided, the Operational Business Service Verification controls are constructed automatically, this may include per control:
3.1.1. Identification of the data sources;
3.1.2. Verification of the availability of the data;
3.1.3. Definition of the methods that will be used to receive the data (e.g., pull or push), and the schedule (on-line, by batch, scheduled) for getting the information;
3.1.3.1. If the data transfer should be done on a pre-defined basis, then a schedule is also defined;
3.1.3.2. If the data becomes available in response to the operation of another control, then the system may identify that other control and also may prevent retrieving the same data multiple times;
3.1.3.3. A different method may be applied for different segments of the data to be provided;
3.1.4. The logic for defining the operation of the control (what could be an acceptable and what is an unacceptable situation);
3.1.5. The schedule of the control is defined;
3.1.6. What will be the action of the controls when an unacceptable situation is detected, such an action may be any one or more of the following actions (but not limited thereto):
3.1.6.1. Generate an Alarm;
3.1.6.2. Create a trouble ticket;
3.1.6.3. Suspend a service instance; and
3.1.6.4. Instruct another system to suspend or revoke a financial transaction.
3.2. An approval notification is sent to the application provider;
3.3. Notifications of the approval are sent to other systems, and/or recorded in databases;
4. The controls can be applied either in audit mode or in operational mode:
4.1. In audit mode the system will receive information about processes that has already ended and will monitor if these processes' behaviors were correct. If a diversion from the defined behavior of any of the processes is detected, the system may take respective measures with respect to that process, including but not limited to:
4.1.1. Generate an Alarm;
4.1.2. Create a trouble ticket; and
4.1.3. Instruct another system to suspend or revoke a financial transaction.
4.2. In operational mode the system will be provided with information during the execution of the process and if a diversion from the defined process is detected, the system may take respective measures, including but not limited to:
4.2.1. Generate an Alarm;
4.2.2. Create a trouble ticket;
4.2.3. Suspend a service instance;
4.2.4. Instruct another system to suspend or revoke a financial transaction.
4.3. Periodically and/or on-request, the system may generate reports per application and/or per control.
4.4. Periodically and/or on-request the system may generate analysis of its finding and may issue recommendations and observations regarding the compliance of the different applications.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:
1. An operational business service verification system comprising at least one computer processor configured for:
receiving a definition of each of a plurality of transactions capable of occurring within a service related software application and constraints for the transactions;
automatically constructing, based on the constraints, operational business service verification controls that are capable of being invoked to verify the transactions upon occurrence within the service-related software application, the controls each relating to one or more of the transactions and including:
identification of one or more data sources providing information relating to the one or more of the transactions,
verification of an availability of the information,
a definition of a method that will be used to receive the information,
a schedule for receiving the information,
logic defining operation of the control to verify the one or more of the transactions,
a schedule of the control, and
an action of the control when the verification of one or more of the transactions fails;
receiving information which relates to an actual occurrence of the plurality of transactions within the service-related software application, wherein the information is received from two or more different systems selected from a group that consists of: a billing system, an intelligent network, a system that monitors the quality of streaming, a service provider (SP) system that delivers the application, a communication service provider (CSP), an advertisements provider (AP) system that delivers advertisements, a revenue assurance system, and a fraud detection system;
responsive to the information, verifying the plurality of transactions that actually occurred within the service- related software application, by invoking the operational business service verification controls; and sending at least one notification when the at least one computer processor of the operational business service verification system does not verify the plurality of transactions.

2. A computer program product stored on a non-transitory computer readable storage medium, that when executed by at least one computer processor of an operational business service verification system, performs the following steps:

receiving a definition of each of a plurality of transactions capable of occurring within a service related software application and constraints for the transactions;

automatically constructing based on the constraints, operational business service verification controls that are capable of being invoked to verify the transactions upon occurrence within the service-related software application, the controls each relating to one or more of the transactions and including:

identification of one or more data sources providing information relating to one or more of the transactions, verification of an availability of the information, a definition of a method that will be used to receive the information, a schedule for receiving the information, logic defining operation of the control to verify the one or more of the transactions, a schedule of the control, and an action of the control when the verification of one or more of the transactions fails;

receiving information which relates to an actual occurrence of the plurality of transactions within the service-related software application, wherein the information is received from two or more different systems selected from a group that consists of: a billing system, an intelligent network, a system that monitors the quality of streaming, a service provider (SP) system that delivers the application, a communication service provider (CSP), an advertisements provider (AP) system that delivers advertisements, a revenue assurance system, and a fraud detection system;

responsive to the information, verifying the plurality of transactions that actually occurred within the service-related software application, by invoking the operational business service verification controls; and sending at least one notification when the at least one computer processor of the operational business service verification system does not verify the plurality of transactions.

3. The computer program product according to claim 2, wherein the service-related software application is an add-on to an application platform.

4. A method, comprising:

receiving, by at least one computer processor of an operational business service verification system, a definition of each of a plurality of transactions capable of occurring within a service-related software application and constraints for the transactions;

automatically constructing, by the at least one computer processor of the operational business service verification system based on the constraints, operational business service verification controls that are capable of being invoked to verify the transactions upon occurrence within the service-related software application, the controls each relating to one or more of the transactions and including:

identification of one or more data sources providing information relating to the one or more of the transactions, verification of an availability of the information, a definition of a method that will be used to receive the information, a schedule for receiving the information, logic defining operation of the control to verify the one or more of the transactions, a schedule of the control, and an action of the control when the verification of one or more of the transactions fails;

receiving, by the at least one computer processor of the operational business service verification system, information which relates to an actual occurrence of the plurality of transactions within the service-related software application, wherein the information is received from two or more different systems selected from a group that consists of: a billing system, an intelligent network, a system that monitors the quality of streaming, a service provider (SP) system that delivers the application, a communication service provider (CSP), an advertisements provider (AP) system that delivers advertisements, a revenue assurance system, and a fraud detection system;

responsive to the information, verifying, by the at least one computer processor of the operational business service verification system, the plurality of transactions that actually occurred within the service-related software application, by invoking the operational business service verification controls; and sending, by the at least one computer processor of the operational business service verification system, at least one notification when the at least one computer processor of the operational business service verification system does not verify the plurality of transactions.

* * * * *